United States Patent [19]

Hoshino et al.

[11] 4,210,605

[45] Jul. 1, 1980

[54] PROCESS FOR THE PREPARATION OF ALIPHATIC AMINES

[75] Inventors: Fumiro Hoshino; Hiroshi Kimura; Kazuhito Matsutani, all of Wakayama, Japan

[73] Assignee: Kao Soap Co., Ltd., Tokyo, Japan

[21] Appl. No.: 11,751

[22] Filed: Feb. 12, 1979

[30] Foreign Application Priority Data

Mar. 16, 1978 [JP] Japan .................................. 53-30149

[51] Int. Cl.$^2$ ........................ C07C 85/02; C07C 83/00
[52] U.S. Cl. ........................... 260/585 B; 260/583 R; 260/583 H; 252/431 C; 252/476; 252/474; 252/471; 252/475
[58] Field of Search ............ 260/583 R, 583 H, 585 B, 260/585 C

[56] References Cited

U.S. PATENT DOCUMENTS

| 2,256,434 | 9/1941 | Klavehn et al. | 260/585 C |
| 3,520,933 | 7/1970 | Adam et al. | 260/583 R |
| 4,036,883 | 7/1977 | Voges et al. | 260/585 B |

*Primary Examiner*—John F. Niebling
*Attorney, Agent, or Firm*—Blanchard, Flynn, Thiel, Boutell & Tanis

[57] ABSTRACT

Aliphatic amines are prepared by reacting an aliphatic alcohol or an aliphatic aldehyde with ammonia or a primary or secondary aliphatic amine, in the presence of a homogeneous colloidal catalyst prepared by reducing a copper or silver salt of a carboxylic acid. The catalyst may optionally contain other metal carboxylates.

17 Claims, No Drawings

PROCESS FOR THE PREPARATION OF ALIPHATIC AMINES

The present invention relates to a process for the preparation of aliphatic amines which comprises reacting an aliphatic alcohol or an aliphatic aldehyde with ammonia or a primary or secondary aliphatic amine.

More specifically, the present invention relates to a process for the preparation of aliphatic amines represented by the following general formula:

wherein $R_1$ stands for a linear or branched, saturated or unsaturated aliphatic group having 7 to 23 carbon atoms, and $R_2$ and $R_3$ stand for a hydrogen atom or a linear or branched, saturated or unsaturated aliphatic group having 1 to 24 carbon atoms,
which comprises reacting an aliphatic alcohol or an aldehyde represented by the following general formulas:

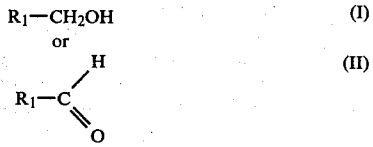

wherein $R_1$ is as defined above, with ammonia or a primary or secondary aliphatic amine represented by the following general formula:

wherein $R_2$ and $R_3$ are as defined above,
and wherein the reaction is carried out at a temperature of 100° to 350° C., in the absence or in the presence of hydrogen, and in the presence of an apparently homogeneous colloidal catalyst prepared by reducing with hydrogen or other reducing agent, a material selected from the group consisting of (1) a copper or silver salt of a carboxylic acid or mixture thereof, hereinafter referred to as component A, (2) a mixture of said component A and component B, wherein component B is one or a mixture of two or more salts of carboxylic acids with one or more elements selected from the group consisting of the elements of group VIII of the Periodic Table of The Elements, manganese and zinc, and (3) a mixture of component A, component B and component C, wherein component C is one or a mixture of two or more salts of carboxylic acids with one or more elements selected from the group consisting of alkali metals and alkaline earth metals.

Aliphatic amines are valuable as surface active agents, particularly for emulsifying and dispersing purposes and they are industrially important as intermediates for preparing anti-corrosion agents, fungicides, fiber dyeing assistants and softeners.

Processes for reacting alcohols or aldehydes with ammonia or primary or secondary amines to form corresponding substituted amines are well-known. The catalysts used for this reaction are ordinarily called hydrogenation-dehydrogenation catalysts.

These hydrogenation-dehydrogenation catalysts are solid catalysts. They are used in the form of a suspension-type catalyst bed when they are in the powder form, and they are used in the form of a fixed catalyst bed when they are in the form of molded bodies. At any rate, these catalysts are used in heterogeneous reaction systems.

The catalysts used for the above reaction are disclosed in various patent specifications, such as those mentioned below, and each of the known catalysts is a solid catalyst that is used in a heterogeneous reaction system.

U.S. Pat. No. 2,953,601 discloses catalysts composed of Raney nickel or nickel supported on alumina. Each of these catalysts is a solid catalyst that is used in a heterogeneous reaction system. In Example 4 of this patent, for instance, it is disclosed that a tertiary amine is obtained, at a yield of 58% and at an alcohol conversion of 82%, by reacting isotridecyl alcohol with ammonia by using a Raney nickel catalyst in an amount of 2.5% by weight.

U.S. Pat. No. 3,223,734 discloses a Raney nickel catalyst, a copper-chromium oxide catalyst, a palladium-carbon catalyst and a nickel-diatomaceous earth catalyst. Each of these catalysts is a solid catalyst that is used in a heterogeneous reaction system. For example, in Example 5 of this patent, dodecyl amine is reacted with dodecyl alcohol, in the presence of a copper-chromium oxide catalyst in an amount of 8.4%, to obtain a tertiary amine in a yield of 63.2%. In Example 17 of this patent, dodecyl alcohol is reacted with dimethyl amine by using 5% of Raney nickel as the catalyst to obtain a tertiary amine at a yield of 69.5%.

German Patent Application Laid-Open Specification No. 1 493 781 discloses supported nickel catalysts, supported cobalt catalysts and copper-chromium oxide catalysts, each of which is a solid catalyst that is used in a heterogeneous reaction system. For example, in Example 6 thereof, 2-octanol is reacted with dimethyl amine in a reaction tube packed with a supported nickel catalyst to obtain a conversion of 95% and a 2-octyldimethyl amine selectivity of 71%.

Japanese Patent Application Laid-Open Specification No. 19604/77 discloses copper-chromium oxide catalysts and cobalt-diatomaceous earth catalysts, each of which is a solid catalyst. For instance, in Example 1 of this specification, it is disclosed that when dodecanol-1 is reacted with dimethyl amine, using 4% of a copper-chromium oxide catalyst, dimethyldodecyl amine having a purity of 98% is obtained at a yield of 92.5% based on the alcohol.

In the foregoing four patent references, namely U.S. Pat. Nos. 2,953,601 and 3,223,734, German Patent Application Laid-Open Specification No. 1 493 781 and Japanese Patent Application Laid-Open Specification No. 19604/77, there are used Raney nickel catalysts, supported nickel catalysts, supported cobalt catalysts, palladium-carbon catalysts and copper-chromium oxide catalysts, each of which a solid catalyst that is used in a heterogeneous reaction system.

These solid catalysts are relatively low in activity, and therefore, they are used in large amounts, such as from 2.5 to 8.5%. Accordingly, various industrial problems are caused. For example, the catalyst expense is very large and a filtration step is indispensable. Further, disposal of the spent catalysts involves a problem of environmental pollution. Therefore, processes using these catalysts are not completely satisfactory from an industrial viewpoint. Moreover, these catalysts are not completely satisfactory with respect to the selectivity, which is a very important reaction factor, as well as catalytic activity.

We have discovered catalysts, for the use in the above reaction, which avoid the problems of the conventional catalysts.

The present invention relates to a process for reacting an aliphatic alcohol or an aldehyde represented by the above formulas (I) or (II) with ammonia or a primary or secondary amine represented by the above formula (III) in order to form a corresponding substituted amine represented by the above formula (IV), wherein there is used a catalyst formed from a starting catalyst material selected from the group consisting of (1) a copper or silver salt of a carboxylic acid or mixture thereof, hereinafter referred to as component A, (2) a mixture of said component A and component B, wherein component B is one or a mixture of two or more salts of carboxylic acids with one or more elements selected from the group consisting of the elements of group VIII of the Periodic Table of The Elements, manganese and zinc, and (3) a mixture of component A, component B and component C, wherein component C is one or a mixture of two or more salts of carboxylic acids with one or more elements selected from the group consisting of alkali metals and alkaline earth metals.

The catalyst of the present invention is used for the reaction after it has been reduced with hydrogen or other reducing agent in a reaction medium (for example, an aliphatic alcohol) or other solvent.

The resulting catalyst has the external appearance of a homogeneous colloidal catalyst and it has properties which are quite different from the properties of known solid catalysts, such as those described above.

For example, the catalyst of the present invention is characterized by a very high catalytic activity. Namely, the activity of the catalyst of the present invention, per unit weight of the metal contained therein, is very high and it is twenty or more times higher than the activity of a known solid catalyst, for example, a Raney nickel catalyst or a copper-chromite catalyst. Even if the catalyst of the present invention is used in a very small amount, such as several hundred ppm based on the starting alcohol or aldehyde, the reaction can progress satisfactorily. Therefore, when the catalyst of the present invention is used, even if the amount used of the catalyst is small, the reaction can be completed in a very short time, with a high yield, at a high selectivity. Furthermore, the invention catalyst can be used repeatedly for the reaction and it need not be discarded as a heavy metal-containing spent catalyst. Therefore, the problem of environmental pollution is greatly reduced.

The catalyst component A of the present invention is a copper or silver salt of a carboxylic acid or a mixture thereof. The kind of carboxylic acid that is used in the present invention is not particularly critical, provided that it contains a carboxyl group in the molecule. Namely, there can be used aliphatic, alicyclic and aromatic carboxylic acids, carboxylic acids having a branched or linear alkyl group and carboxylic acids having a plurality of carboxyl groups or other substituents.

Among these carboxylic acids, it is preferred to employ carboxylic acids having 5 to 36 carbon atoms.

Either a natural product or a synthetic product can be used as the carboxylic acid moiety of the carboxylic acid salt (catalyst component A). For example, there can be used valeric acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, arachic acid, behenic acid, oleic acid and compounds formed by introducing two or more carboxyl groups in these acids.

As the catalyst component B of the present invention, there is employed a carboxylic acid salt of a metal selected from the elements of the group VIII of the Periodic Table, such as nickel, cobalt, iron and palladium, and manganese and zinc. These metals are used in the form of their salts with the same class of carboxylic acids as described above.

As the catalyst component C of the present invention, there is employed a carboxylic acid salt of a metal selected from alkali metals, such as sodium and potassium, and alkaline earth metals, such as magnesium, calcium and barium. As the carboxylic acid moiety, there can be used the same class of carboxylic acids as described above. There can be mentioned, for example, stearic acid, lauric acid and the like. As specific examples of the catalyst component C, there can be mentioned barium stearate, barium laurate and sodium stearate.

The catalyst compound A alone can be used to prepare the catalyst in the present invention. For example, cupric stearate soap alone can be used as the catalyst. However, it is preferred that the catalyst component A is used in combination with at least one salt selected from the catalyst component B mentioned above. For example, in the case of a combination of cupric stearate soap with nickel stearate soap, the catalytic activity is increased compared to the catalytic activity attained by the use of the cupric stearate soap alone. It is especially preferred that the catalyst component A is used in combination with at least one salt selected from catalyst component B mentioned above and at least one salt selected from catalyst component C mentioned above. For example, a combination of the catalyst component A with the catalyst components B and C is superior to the catalyst prepared from catalyst component A alone or a combination of catalyst component A with catalyst component B, with respect to its activity and durability, and in this case, the colloidal catalyst is further stabilized.

The mixing ratio of these catalyst components A, B and C is optional, except that the amount of catalyst component A, calculated as the metal soap or its complex, is at least 10 mol percent, based on the sum of catalyst components A, B and C, calculated as the metal soap or its complex. The amount used of the catalyst is 0.001 to 5%, preferably 0.001 to 1%, calculated as the metal, based on the starting alcohol or aldehyde.

Prior to use in the amine preparation reaction, the catalyst of the present invention is dissolved in a reaction medium (for example, an aliphatic alcohol) or other solvent and is reduced with hydrogen or other reducing agent such as $Al(C_2H_5)_3$ or $(C_2H_5)_2Al(OC_2H_5)$.

It is preferred that the catalyst be dissolved in a reaction medium and that it be reduced with hydrogen at a temperature of 100° to 200° C. This reduction is very easy to carry out and it is completed in a short time while elevating the temperature to 100° to 200° C. The resulting catalyst is an apparently (superficially) homogeneous colloidal catalyst that cannot be separated from the reaction mixture by a customary filtration operation.

To the apparently homogeneous colloidal catalyst thus formed by reduction, there is added the reactant for preparing the desired substantial amine compound, for example, ammonia, dimethyl amine or a primary or secondary amine. Progress of the reaction can be assured by outflow of by-product water formed by the reaction.

The reaction can proceed even in the absence of hydrogen. For example, in the case of the reaction of an alcohol with dimethyl amine, the reaction proceeds by feeding dimethyl amine gas alone to the reaction mixture after reduction of the catalyst is completed in the alcohol, and the desired tertiary amine can be obtained in a yield of 90.9%, at an alcohol conversion of 96.2%.

However, it is preferred that the reaction be carried out in the presence of a small amount of hydrogen, because formation of high-boiling-point substances is reduced and the reaction time can be further shortened to some extent.

The activity of the catalyst of the present invention is reduced when it remains in contact with water for a long time. Accordingly, it is preferred that water formed by the reaction be continuously removed from the reaction mixture.

The reaction is carried out at 100° to 350° C., preferably 190° to 240° C. The reaction can be conducted even under a reduced pressure, but it is preferred that the reaction be carried out under a pressure of 0 to 10 atm (gauge pressure), especially under atmospheric pressure.

In the case of a reaction between a long-chain aliphatic alcohol and dimethyl amine, it has been confirmed that when a ternary catalyst of cupric stearate, nickel stearate and barium stearate (containing 0.1% of copper metal, 0.02% of nickel metal and 0.04% of barium metal, based on the starting alcohol) is used and the reaction is carried out at 210° C. under atmospheric pressure for 2 hours, the conversion of the alcohol is 100% and the yield of the desired tertiary amine is 96% (with the balance being high-boiling-point substances). The tertiary amine having a purity higher than 99% can be obtained by subjecting the reaction mixture to distillation.

From these experimental results, it can readily be understood that the catalyst of the present invention has a catalytic activity scores of times higher than that of conventional solid catalysts and a tertiary amine having a very high purity can be obtained in a very high yield.

This fact indicates that, according to the process of the present invention, polymerization of the aldehyde or the like can be remarkably reduced and a disproportionation reaction of dimethyl amine, namely formation of monomethyl amine or trimethyl amine, does not substantially occur, and that the catalyst of the present invention is very excellent also with respect to the selectivity.

When a primary or secondary amine, such as a monoalkyl amine or monoalkylmethyl amine, is present in admixture with a long-chain monoalkyldimethyl amine, because the vapor pressures of these substances are substantially identical, separation thereof is very difficult and the purity of the monoalkyldimethyl amine as the desired tertiary amine final product is reduced. A tertiary amine is sometimes used industrially in that form, but in many cases, it is used industrially in the form of a derivative such as a quaternary salt after it has been reacted with benzyl chloride or methyl chloride. The presence of primary and secondary amines has serious effects on the yield and quality of such derivatives, because the reactivity of the primary or secondary amine differs from that of the tertiary amine. The quality requirements for monoalkyldimethyl amines now commercially available are very severe. According to the process of the present invention, the amounts of primary and secondary amines present in the final reaction product can be reduced to below 0.5%. Therefore, the catalyst of the present invention can provide products satisfying these stringent quality requirements. It is evident that the catalyst of the present invention is superior to the conventional solid catalysts.

The catalyst of the present invention is very stable after it has been used for the reaction, and the reaction mixture retains its original homogeneous colloidal state. The distillation residue can be used repeatedly, as a catalyst, for subsequent reaction cycles. Accordingly, the filtration step, which is necessary when the conventional solid catalysts are used, can be omitted, according to the present invention.

After the reaction is completed, the reaction mixture is subjected to conventional distillation, without performing filtration, to separate it into a distillate and a residue. The catalyst is present in the residue while retaining its superficially homogeneous colloidal state, and it can be used for subsequent reactions as it is. It has been confirmed that even if the catalyst is thus used repeatedly, the activity of the catalyst is not substantially reduced.

When high-boiling-point substances are accumulated in the distillation residue by repeated reuse of catalyst or when a long-chain trialkyl tertiary amine, the separation of which by distillation is very difficult, is prepared, the addition of active carbon to the distillation residue or the reaction mixture is effective to coagulate the colloidal catalyst easily and the catalyst thereby can easily be separated by a conventional separation operation.

When a fatty acid is added to the thus-separated coagulated catalyst and the mixture is heated, metallic soap reformation can easily be accomplished and that saponification product can be used again as a fresh catalyst.

A closed system for catalyst recycling is made possible by the catalyst of the present invention.

The reaction can be conducted batchwise or in a continuous manner.

For example, when the reaction is carried out batchwise, since the catalyst has an apparently homogeneous colloidal form, a special agitator is not needed for the reaction mixture. When the reaction is carried out in a continuous manner, a special stirrer is not required and good results can be obtained relying only on the gas flow itself to effect agitation of the reaction mixture.

In case of a batch reaction, if a distillation apparatus is attached to the reaction vessel, distillation can be performed directly after the reaction is completed, without taking out the reaction mixture from the reaction vessel. If the starting reactants are added to the distillation residue, the subsequent cycle of the reaction can be initiated even without effecting reduction of the residue, which is useful, as it is, as the catalyst. The reaction apparatus can be simplified by using the catalyst of the present invention.

The starting alcohol that is used in the present invention includes linear and branched, saturated and unsaturated aliphatic hydrocarbon alcohols such as octyl alcohol, lauryl alcohol, myristyl alcohol, cetyl alcohol, oleyl alcohol, stearyl alcohol, mixtures thereof, Ziegler alcohols produced by the Ziegler process and oxo alcohols produced by the oxo process. Instead of the alcohols, there can be used linear and branched, saturated and unsaturated aliphatic hydrocarbon aldehydes such as lauryl aldehyde and oxo aldehydes.

As the aliphatic amine to be reacted with such alcohol or aldehyde, there can be mentioned primary amines such as methyl amine, ethyl amine, dodecyl amine and octadecyl amine, secondary amines such as dimethyl amine, diethyl amine, didodecyl amine and dioctadecyl amine, and ammonia.

The present invention will now be described in detail by reference to the following Examples. Also Comparative Examples using conventional copper-chromite and Raney nickel catalysts are illustrated. In the Examples and Comparative Examples, all references to %, mean percent by weight.

EXAMPLE 1

Into a 1000 ml four-necked flask equipped with a condenser and a separator for separating the water formed by the reaction were charged 300 g of dodecanol and 12 g of cupric stearate (0.4% calculated as copper metal, based on the alcohol), a stirrer in the flask was rotated, nitrogen atmosphere substitution in the reaction system was performed, the reaction was heated to 100° C., and hydrogen gas was fed into the reactor by bubbling same through a flow meter at a flow rate of 60 l/hr. The temperature was elevated to 210° C. over a period of about 40 minutes. During this period, cupric stearate was reduced to form a homogeneous colloidal catalyst.

While the temperature was maintained at 210° C., a mixed gas of dimethyl amine and hydrogen (the dimethyl amine concentration was 8.5%) was fed in at a flow rate of 65.6 l/hr. to bubble through the contents of the flask. The mixture of produced water and oil was passed through the condenser and the separator, and the oil was continuously returned to the reactor. In this manner, the reaction was conducted for 8 hours. The composition of the reaction mixture was determined from the amine value and the results of gas chromatography. The following results were obtained.
Composition of oil:
Dimethyldodecyl amine: 82.5%
Unreacted alcohol: 7.1%
High-boiling-point substances (didodecylmethyl amine, aldol condensates and the like): 10.4%

EXAMPLE 2

In the same reactor as used in Example 1, 3 g of cupric stearate (0.1% calculated as copper metal based on the alcohol) and 0.6 g of nickel stearate (0.02% calculated as nickel metal, based on the alcohol) were added to 300 g of dodecanol, and reduction was carried out under the same conditions as described in Example 1. The cupric stearate and nickel stearate were converted to a superficially homogeneous colloidal catalyst.

While the temperature was maintained at 210° C., a mixed gas of dimethyl amine and hydrogen (the dimethyl amine concentration was 67%) was fed in at a flow rate of 55 l/hr., to bubble through the contents of the reactor. The results of analysis of the reaction product formed by 3 hours' reaction were as follows.
Dimethyldodecyl amine: 80.3%
Unreacted alcohol: 15.7%
High-boiling-point substances: 4.0%

From these results, it was found that when cupric stearate and nickel stearate were used, in combination, in amounts of 0.1% and 0.02%, calculated as copper and nickel metals, respectively, there was attained a very high effect of shortening the reaction time.

EXAMPLE 3

In the same reactor as used in Example 1, 300 g of dodecanol was mixed with 3 g of cupric stearate (0.1% calculated as copper metal, based on the alcohol), 0.6 g of nickel stearate (0.02% calculated as nickel metal, based on the alcohol) and 0.6 g of barium stearate (0.04% calculated as barium metal, based on the alcohol), and reduction was carried out under the same conditions as described in Example 1. An apparently completely homogeneous colloidal catalyst was formed. While the temperature was maintained at 210° C., a mixed gas of dimethyl amine and hydrogen (the dimethyl amine concentration was 66%) was fed in at a flow rate of 53 l/hr., to bubble through the contents of the reaction vessel. After 2 hours' reaction, the reaction product was analyzed and the following results were obtained.
Dimethyldodecyl amine: 96.1%
Unreacted alcohol: 0.0%
Didodecylmethyl amine: 3.5%
Others: 0.4%

From the foregoing results, it was found that a ternary catalyst comprising cupric stearate, nickel stearate and barium stearate was excellent with respect to the catalytic activity and selectivity.

EXAMPLE 4

In the same reactor as used in Example 1, 300 g of dodecanol was mixed with 1.9 g of silver laurate (0.14% calculated as silver metal, based on the alcohol) and 0.6 g of nickel stearate (0.02% calculated as nickel metal, based on the alcohol) and reduction was carried out under the same conditions as described in Example 1. An apparently completely homogeneous colloidal catalyst was formed. While the temperature was maintained at 210° C., a mixed gas of dimethyl amine and hydrogen (the dimethyl amine concentration was 66%) was fed in at a flow rate of 43 l/hr., to bubble through the contents of the reaction vessel. The results of analysis of the reaction product obtained by 6 hours' reaction were as follows.
Dimethyldodecyl amine: 91.2%
Unreacted alcohol: 6.8%
Others: 2.0%

From the foregoing results, it was found that a silver soap can be used instead of a copper soap.

EXAMPLE 5

By using the same reactor as used in Example 1, the effect of the catalyst component B of the present invention on the reaction was examined. The reduction conditions were the same as described in Example 1. At a reaction temperature of 210° C., a mixed gas of dimethyl amine and hydrogen (the dimethyl amine concentration was 66%) was fed in at a flow rate of 53 l/hr. As the catalyst component A, cupric stearate was used in an amount of 0.1%, calculated as copper metal, based on the starting alcohol, and as the catalyst component C, barium stearate was used in an amount of 0.04%, calculated as barium metal, based on the alcohol. As the catalyst component B, there was used stearic acid soaps of various divalent metals as indicated in Table 1, in an amount of 0.02%, calculated as the metal, based on the alcohol.

The results obtained are shown in Table 1.

Table 1

| Run No. | Metal of Catalyst Component B | Reaction Time (hours) | Composition (%) of Reaction Product | | |
|---|---|---|---|---|---|
| | | | dimethyl-dodecyl amine | unreacted alcohol | other high-boiling-point substances |
| 1 | nickel | 2 | 96.1 | 0.0 | 3.9 |
| 2 | cobalt | 8 | 91.6 | 4.0 | 4.4 |
| 3 | zinc | 8 | 93.3 | 2.7 | 4.0 |
| 4 | iron | 6 | 90.5 | 6.2 | 3.3 |
| 5 | manganese | 6 | 75.5 | 2.9 | 21.6 |
| 6 | palladium | 8 | 90.3 | 7.6 | 2.1 |

EXAMPLE 6

By using the same reactor as used in Example 1, the effect of the catalyst component C of the present invention on the reaction was examined. The reduction conditions were the same as in Example 1. At a reaction temperature of 210° C., a mixed gas of dimethyl amine and hydrogen (the dimethyl amine concentration was 25%) was fed in at a flow rate of 80 l/hr. As the catalyst component A, cupric stearate was used in an amount of 0.1%, calculated as copper metal, based on the starting alcohol, and as the catalyst component B, nickel stearate was used in an amount of 0.02%, calculated as nickel metal, based on the alcohol. As the catalyst component C, stearic acid soaps of various metals as indicated in Table 2, were used in an amount of 0.2%, calculated as the metal, based on the alcohol.

The results obtained are shown in Table 2.

Table 2

| Run No. | Metal of Catalyst Component C | Reaction Time (hours) | Composition (%) of Reaction Product | | |
|---|---|---|---|---|---|
| | | | dimethyl-dodecyl amine | unreacted alcohol | other high-boiling-point substances |
| 7 | barium | 5 | 95.0 | 0.4 | 4.6 |
| 8 | sodium | 5 | 94.1 | 2.7 | 3.2 |
| 9 | calcium | 5 | 92.1 | 0.5 | 7.4 |

EXAMPLE 7

By using the same reactor as used in Example 1, the effect of the catalyst components A, B and C on the reaction was examined. The reduction conditions were the same as in Example 1. A mixed gas of dimethyl amine and hydrogen (the dimethyl amine concentration was 66%) was fed in at a feed rate of 53 l/hr. The results obtained are shown in Table 3.

In Table 3, the amount of each catalyst component is expressed in terms of %, calculated as the metal, based on the starting alcohol.

Table 3

| Run No. | Catalyst Component A | | Catalyst Component B | | Catalyst Component C | |
|---|---|---|---|---|---|---|
| | Compound | Amount (%) | Compound | Amount (%) | Compound | Amount (%) |
| 10 | cupric benzoate | 0.03 | nickel benzoate | 0.007 | barium stearate | 0.013 |
| 11 | cupric benzoate | 0.03 | nickel benzoate | 0.007 | barium benzoate | 0.013 |
| 12 | cupric stearate | 0.03 | nickel benzoate | 0.007 | barium stearate | 0.013 |
| Example 3 | cupric stearate | 0.1 | nickel stearate | 0.02 | barium stearate | 0.04 |
| 13 | cupric laurate | 0.1 | nickel stearate | 0.02 | barium stearate | 0.04 |
| 14 | cupric caproate | 0.1 | nickel stearate | 0.02 | barium stearatee | 0.04 |
| 15 | cupric valerate | 0.1 | nickel stearate | 0.02 | barium stearate | 0.04 |
| 16 | cupric butyrate | 0.1 | nickel stearate | 0.02 | barium stearate | 0.04 |
| 17 | cupric stearate | 0.03 | nickel stearate | 0.007 | barium laurate | 0.013 |
| 18 | cupric stearate | 0.03 | nickel stearate | 0.007 | barium caproate | 0.013 |

| Run No. | Reaction Temperature (°C.) | Reaction Time (hours) | Composition (%) of Reaction Product | | |
|---|---|---|---|---|---|
| | | | dimethyl-dodecyl amine | unreacted alcohol | other high-boil-point substances |
| 10 | 220 | 6 | 92.3 | 5.7 | 2.0 |
| 11 | 220 | 8 | 89.0 | 6.9 | 4.1 |
| 12 | 220 | 5 | 95.3 | 2.4 | 2.3 |
| Example 3 | 210 | 2 | 96.1 | 0.0 | 3.9 |
| 13 | 210 | 2 | 95.4 | 1.5 | 3.1 |
| 14 | 210 | 2 | 94.3 | 1.6 | 3.4 |
| 15 | 210 | 3 | 95.1 | 1.4 | 3.5 |
| 16 | 210 | 3 | 3.0 | 96.9 | 0.1 |

Table 3-continued

| | | | | | |
|---|---|---|---|---|---|
| 17 | 220 | 4 | 90.2 | 7.3 | 2.5 |
| 18 | 220 | 4 | 85.5 | 12.6 | 1.9 |

From the results shown in Table 3, it was found that not only aliphatic carboxylic acid salts, but also aromatic carboxylic acid salts, can be used as the carboxylic acid salt in the present invention. Also from the results of Run No. 16, it was found that a carboxylic acid salt having up to 4 carbon atoms cannot be used.

EXAMPLE 8

By using the same reactor as used in Example 1, the effect of the amount of the catalyst on the reaction time was examined. The reduction conditions were the same as in Example 1. At a reaction temperature of 210° or 230° C., a mixed gas of dimethyl amine and hydrogen (the dimethyl amine concentration was 66%) was fed in at a flow rate of 53 l/hr. The results obtained are shown in Table 4.

As the catalysts, there were used cupric stearate, nickel stearate and barium stearate in the amounts indicated in Table 4 (%, calculated as the metal, based on the starting alcohol).

Table 4

| Run No. | Catalysts (%) | | | Reaction Temperature (°C.) | Reaction Time (hours) | dodecyl amine | unreacted alcohol | other high-boiling-pooint substances |
|---|---|---|---|---|---|---|---|---|
| | cupric stearate | nickel stearate | barium stearate | | | | | |
| Example 3 | 0.10 | 0.02 | 0.04 | 210 | 2 | 96.1 | 0.0 | 3.9 |
| 19 | 0.033 | 0.007 | 0.013 | 210 | 5 | 93.2 | 2.6 | 4.2 |
| 20 | 0.01 | 0.002 | 0.004 | 210 | 10 | 90.6 | 6.5 | 2.9 |
| 21 | 0.033 | 0.007 | 0.013 | 230 | 2 | 94.2 | 0.6 | 5.2 |

From the results shown in Table 4, it was found that the reaction proceeds sufficiently even when the amount of the catalyst component A is 0.01%, calculated as copper metal, based on the starting alcohol.

EXAMPLE 9

The reaction was carried out by using an aldehyde instead of an alcohol.

The same reaction vessel as used in Example 1 was charged with 150 g of dodecanol, 1.5 g of cupric stearate, 0.3 g of nickel stearate and 0.3 g of barium stearate, as the catalyst components. In the same manner as described in Example 1, the temperature was elevated and reduction of the catalyst was conducted. Then, at a reaction temperature of 210° C., a mixed gas of dimethyl amine and hydrogen (the dimethyl amine concentration was 54%) was fed in at a flow rate of 39 l/hr. to bubble through the contents of the reactor. The reaction was conducted for 2 hours. The conversion of the alcohol was 100%. Then, while feeding the abovementioned mixed gas, 150 g of dodecyl aldehyde was added dropwise to the reaction mixture over a period of one hour. After completion of the dropwise addition, the reaction was further conducted for 2 hours under the above-mentioned conditions to obtain the following results.
Dimethyldodecyl amine: 86.1%
Unreacted alcohol: 0.0%
High-boiling-point substances, etc.: 13.9%

EXAMPLE 10

With the same reactor as used in Example 1, reaction was conducted between various alcohols and various amines. The reduction conditions were the same as in Example 1. A mixed gas of hydrogen and monomethyl amine, ammonia or dimethyl amine (the concentration of monomethyl amine, ammonia or dimethyl amine was 66%) was fed in at a flow rate of 48 l/hr.

As the catalysts, there were employed cupric stearate, nickel stearate and barium stearate in amounts of 0.1%, 0.02% and 0.04%, respectively, calculated as the metal, based on the starting alcohol. Incidentally,, the reaction between dodecanol and dodecyl amine was initiated by charging the amine at a time after reduction of the catalyst had been conducted in the alcohol as described in Example 1.

The results obtained are shown in Table 5.

Table 5

| Run No. | Kind of Alcohol | Kind of Amine | Temperature (°C.) | Reaction Time (hours) | Conversion (%) of Alcohol |
|---|---|---|---|---|---|
| 22 | dodecanol | monomethyl amine | 220 | 5 | 70.1 |
| 23 | dodecanol | ammonia | 220 | 3 | 83.2 |
| 24 | dodecanol | dodecyl amine | 210 | 4 | 82.9 |
| 25 | hexadecanol | dimethyl amine | 210 | 2 | 96.0 |
| 26 | octadecanol | dimethyl amine | 210 | 2 | 97.1 |
| 27 | oxo alcohol 1213 (synthetic alcohol $C_{12}$-$C_{13}$) | dimethyl amine | 210 | 2 | 82.7 |

EXAMPLE 11

The reaction was carried out under the same alcohol and catalyst conditions as described in Example 3 and at the same reaction temperature as described in Example 3, while feeding dimethyl amine alone at a flow rate of 41 l/hr., without using hydrogen, to bubble through the contents of the reactor.

The reaction product recovered after 3 hours' reaction was analyzed. The following results were obtained.
Dimethyldodecyl amine: 92.7%
Unreacted alcohol: 3.8%
Other high-boiling-point substances: 3.5%

From these results, it was found that the reaction can be completed in a short time even in the absence of hydrogen.

EXAMPLE 12

The following experiment was carried out to examine the durability of the catalyst.

The same reactor as used in Example 1 was charged with 300 g of dodecanol, 3 g of cupric stearate, 0.6 g of nickel stearate and 0.6 g of barium stearate, and reduction was carried out under the same conditions as described in Example 1.

At a reaction temperature of 210° C., a mixed gas of dimethyl amine and hydrogen (the dimethyl amine concentration was 30%) was fed at a flow rate of 86 l/hr. into the reactor to bubble through the contents of the reactor. Reaction was carried out under these conditions for 5 hours. The reaction mixture containing the catalyst was directly subjected to distillation and the recovered distillation residue containing the catalyst was used for the subsequent reaction cycle.

More specifically, 300 g of dodecanol was added to the distillation residue, and without addition of a fresh catalyst, the reaction was conducted under the same conditions as described above. This operation was repeated 4 times. The results obtained are shown in Table 6.

Table 6

| Run No. | Catalyst used | Results of Distillation (%) | | Composition of Distillate | |
|---|---|---|---|---|---|
| | | distillate | residue (%) | dimethyl-dodecyl amine | unreacted alcohol |
| 28 | fresh catalyst | 93.7 | 6.3 | 99.5 | 0.0 |
| 29 | catalyst after one cycle of reaction | 89.6 | 10.4 | 99.6 | 0.0 |
| 30 | catalyst after 2 cycles of reaction | 86.7 | 13.3 | 99.3 | 0.2 |
| 31 | catalyst after 3 cycles of reaction | 84.7 | 15.3 | 99.1 | 0.2 |
| 32 | catalyst after 4 cycles of reaction | 82.7 | 17.3 | 99.0 | 0.3 |

The reason why the amount of the residue increased gradually was that high-boiling-point materials accumulated therein throughout the cycles of the reaction.

From the foregoing results, it was found that even if the catalyst is used repeatedly, the high activity and selectivity inherent of the catalyst of the present invention can be substantially maintained and the catalyst of the present invention is very excellent in the durability.

Comparative Example 1

Reaction was carried out by using a Raney nickel catalyst.

The same reactor as used in Example 1 was charged with 300 g of dodecanol and 12 g of a Raney nickel catalyst (4%, calculated as nickel metal, based on the alcohol) formed by developing a Raney alloy with sodium hydroxide, and reaction was carried out under the same conditions as described in Example 1 for 2 hours. The following results were obtained.

Dimethyldodecyl amine: 44.1%
Didodecyl amine: 29.8%
Tridodecyl amine: 6.7%
Unreacted alcohol: 11.3%
Other high-boiling-point substances: 8.1%

From these results, it was found that the activity of the Raney nickel catalyst is relatively low, even if it is used in a much larger amount than the amount used of the catalyst of the present invention, and that the selectivity is very low in the case of the Raney nickel catalyst.

Comparative Example 2

A copper-chromite catalyst was used and the obtained results were compared with the results obtained with the catalyst of the present invention.

The same reactor as used in Example 1 was charged with 300 g of dodecanol. After reduction of the catalyst with hydrogen, the reaction was carried out at a reaction temperature of 210° C. The results shown in Table 7 were obtained.

The amounts of the catalyst in %, calculated as the metal based on the starting alcohol, are shown in the Table. Metal stearates were used in each example as metallic soaps.

Table 7

| Comparative Run No. | Catalyst | | Mixed Gas | | Reaction Time (hours) | Composition (%) of Reaction Product | | |
|---|---|---|---|---|---|---|---|---|
| | Kind | Amount (%) | Flow Rate (l/hr) | Dimethyl amine Concentration (%) | | dimethyl-dodecyl amine | unreacted alcohol | other high-boiling-point substances |
| 2-1 | copper-chromite catalyst | 0.033 | 53 | 66 | 5 | 19.7 | 70.5 | 9.8 |
| 2-1 | catalyst *1 of present invention | 0.033 | 53 | 66 | 5 | 94.6 | 3.1 | 2.3 |
| 2-2 | copper-chromite catalyst | 0.033 | 132 | 9 | 3 | 22.3 | 77.2 | 0.5 |
| 2-2 | catalyst *1 of present invention | 0.033 | 132 | 9 | 3 | 76.2 | 22.7 | 1.1 |
| 2-3 | copper-chromite catalyst | 1.6 | 53 | 66 | 8 | 77.2 | 2.1 | 20.7 |
| 2-3 | catalyst | 0.1 | 53 | 66 | 2 | 96.1 | 0.0 | 3.9 |

Table 7-continued

| Comparative Run No. | Catalyst Kind | Catalyst Amount (%) | Mixed Gas Flow Rate (l/hr) | Dimethyl amine Concentration (%) | Reaction Time (hours) | Composition (%) of Reaction Product dimethyl-dodecyl amine | unreacted alcohol | other high-boiling-point substances |
|---|---|---|---|---|---|---|---|---|
| | *2 of present invention | | | | | | | |

Note
Catalyst composition (% by weight of each metal, based on starting alcohol):
Catalyst *1: Cu = 0.033, Ni = 0.007, Ba = 0.013
Catalyst *2: Cu = 0.1, Ni = 0.02, Ba = 0.04

In Table 7 are shown the results obtained when the dimethyl amine concentration was high (Comparative Run No. 2-1), the results obtained when the dimethyl amine concentration was low but the flow rate of the mixed gas was high (Comparative Run No. 2-2) and the results obtained when the amount of the catalyst was increased and the dimethyl amine concentration was high (Comparative Run No. 2-3). From the results shown in Table 7, it was found that in each Comparative Run, the catalyst of the present invention was much superior to the copper-chromite catalyst with respect to both the catalytic activity and the selectivity.

The embodiments of the invention in which an exclusive property or privilege is claimed are defined as follows:

1. In a process for the preparation of aliphatic amine having the formula:

wherein $R_1$ is a linear or branched, saturated or unsaturated aliphatic group having 7 to 23 carbon atoms, and $R_2$ and $R_3$ each is hydrogen or a linear or branched, saturated or unsaturated aliphatic group having 1 to 24 carbon atoms,
which comprises reacting an aliphatic alcohol or an aliphatic aldehyde having the formulas:

wherein $R_1$ is the same as defined above, with ammonia or a primary or secondary aliphatic amine having the formula:

wherein $R_2$ and $R_3$ are the same as defined above, at a temperature of 100° to 350° C. in the presence of a catalyst, the improvement which comprises: said catalyst is a homogeneous colloidal catalyst prepared by reducing with hydrogen or other reducing agent, a catalyst material selected from the group consisting of (1) component A, wherein component A is a copper salt or silver salt of a carboxylic acid or a mixture of said salts, (2) a mixture of said component A and component B, wherein component B is one or a mixture of two or more salts of carboxylic acids with one or more elements selected from the group consisting of the elements of group VIII of the Periodic Table of The Elements, manganese and zinc, and (3) a mixture of said component A, said component B and component C, wherein component C is one or a mixture of two or more salts of carboxylic acids with one or more elements selected from the group consisting of alkali metals and alkaline earth metals, said carboxylic acids having from 5 to 36 carbon atoms.

2. A process for the preparation of aliphatic amines according to claim 1 wherein said carboxylic acids are aliphatic hydrocarbon carboxylic acids having 5 to 22 carbon atoms.

3. A process according to claim 1 in which said catalyst material is dissolved in said alcohol or said aldehyde in the liquid phase, then hydrogen gas is flowed through the solution of said catalyst in said alcohol or said aldehyde at a temperature of from about 100° to 200° C. until said catalyst material is reduced and is transformed to a homogeneous colloidal state in said alcohol or said aldehyde, and then said ammonia or said primary or secondary aliphatic amine in a gaseous state is bubbled through said alcohol or aldehyde in the liquid phase.

4. A process according to claim 1 or claim 3 in which the amount of said catalyst is from 0.001 to 5 wt %, calculated as the metals, based on the weight of the starting alcohol or aldehyde.

5. A process according to claim 1 or claim 3 in which the amount of said catalyst is from 0.01 to 1 wt. %, calculated as the metals, based on the weight of the starting alcohol or aldehyde.

6. A process according to claim 1 in which the reaction temperature is from 190° to 240° C.

7. A process according to claim 1 or claim 3, including the step of continuously removing water from the reaction mixture as the reaction proceeds.

8. A process according to claim 1 or claim 3 including the step of distilling the reaction mixture after completion of the reaction to separate the formula IV product as the distillate, and wherein said catalyst remains in the distillation residue.

9. A process according to claim 8 which comprises adding to said distillation residue an additional amount of said aliphatic alcohol or aliphatic aldehyde and said ammonia or said primary or secondary aliphatic amine and repeating the reaction to form the formula IV final product.

10. A process according to claim 1 in which said catalyst material consists of component A.

11. A process according to claim 1 in which said catalyst material consists of a mixture of component A and component B.

12. A process according to claim 11 in which said group VIII element is nickel, cobalt, iron or palladium.

13. A process according to claim 1 in which said catalyst material consists of a mixture of components A, B and C.

14. A process according to claim 13 in which said group VIII element is nickel, cobalt, iron or palladium, said alkali metal is sodium or potassium, and said alkaline earth metal is magnesium, calcium or barium.

15. A process according to claim 10 in which said component A is cupric stearate.

16. A process according to claim 11 in which said component A is cupric stearate and said component B is nickel stearate.

17. A process according to claim 13 in which said component A is cupric stearate, component B is nickel stearate and component C is barium stearate.

* * * * *